Patented Aug. 17, 1948

2,447,395

UNITED STATES PATENT OFFICE 2,447,395

MORPHOLINE SUBSTITUTED ESTERS

Lee C. Cheney, Detroit, and William G. Bywater, Grosse Pointe Woods, Mich., assignors to Parke, Davis & Company, Detroit, Mich., a corporation of Michigan No Drawing. Application July 5, 1940, Serial No. 344,136

8 Claims. (Cl. 260—247)

The invention relates to the preparation of a certain class of morpholine substituted esters, and more particularly to a class of compounds which may be designated as aliphatic acid esters of morpholine substituted alcohols. The general formula for these compounds is as follows:

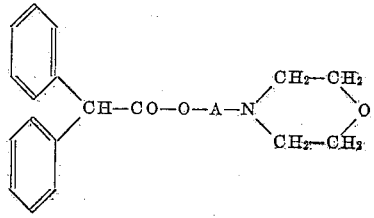

where A represents a member of the group consisting of straight chain and branched chain alkylene residues.

The invention includes also salts of the compounds of the above general formula with acids HX where X is an anion of an organic or inorganic acid. The preferred salts are those of non-oxidizing, non-toxic organic or inorganic acids which are water-soluble. The invention is more fully illustrated by the following examples:

*Example 1.—β-4-morpholinoethyl diphenylacetate and salts*

A. Diphenylacetyl chloride is prepared by refluxing 21.2 g. (0.1 mole) of diphenylacetic acid with 40 g. (0.36 mole) of thionyl chloride for one hour. The mass is allowed to cool and excess thionyl chloride removed in vacuo. The crude acid chloride cooled in an ice bath, is treated with 13.12 grams (0.1 mole) of β-4-morpholinoethanol without a diluent. To complete the exothermic reaction, the mixture is heated in an oil bath at 120° for 1.75 hours and to isolate the desired ester hydrochloride, the brown solid is dissolved in 600–700 ml. of hot ethyl acetate and allowed to crystallize. After three recrystallizations from ethyl acetate, the ester hydrochloride is found to melt at 136–137° C. (corr.). Micro-Dumas nitrogen analysis gives N, 3.85 and 3.95%, while the calculated nitrogen content for $C_{20}H_{24}O_3NCl$ is 3.87%.

B. Diphenylacetyl chloride is prepared as in A from 63.7 g. (0.3 mole) of diphenylacetic acid. It is dissolved in 50 ml. of sodium-dried dioxane and added during 15 minutes to a stirred solution of 39.4 g. (0.3 mole) of β-4-morpholinoethanol in 50 ml. of sodium-dried dioxane. An additional 25 cc. of dioxane is employed as a rinse. The resulting mixture is then stirred and refluxed for 2 hours, cooled somewhat and diluted with 200 ml. of anhydrous ethyl acetate. Upon further cooling fine, white crystals separate which, following removal by filtration, are suspended in ether and rendered basic with sodium carbonate solution to secure an ether solution of β-4-morpholinoethyl diphenylacetate. It (ca. 700 ml.) is washed thrice with water and dried over anhydrous potassium carbonate (which is eventually removed by filtration) and is employed to prepare water-soluble, therapeutically useful salts of this ester, but if desirable the ester itself may be secured in pure form as an oil by distilling under reduced pressure.

To obtain the hydrochloride, absolute alcoholic hydrogen chloride is added to the ether solution and the oily hydrochloride which separates is induced to crystallize by rubbing with a glass rod. β-4-morpholinoethyl diphenylacetate hydrochloride having the formula

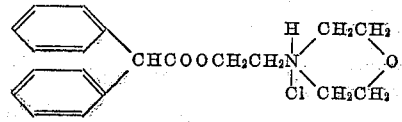

separates as white crystals melting at 136.5–137.5° which after recrystallization from ethyl acetate melts at 137.5–138° (corr.).

The hydrobromide is prepared in a similar manner by passing gaseous hydrogen bromide, generated from bromine and boiling tetralin, directly into the ether solution, or by treating the ether solution with 48% aqueous hydrobromic acid. In the latter case the mixture is evaporated to dryness under reduced pressure, the product is taken up in boiling absolute alcohol and then allowed to crystallize. The β-4-morpholinoethyl diphenylacetate hydrobromide is obtained as small white hygroscopic crystals having the formula

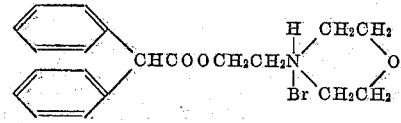

which melts at 119–120° (corr.; sealed tube).

C. If instead of one equivalent of β-4-morpholinoethanol, two or more equivalents are employed in dioxane solution, the ester is secured directly in improved yields. β-4-morpholinoethyl diphenylacetate is also secured by the action of two equivalents morpholine upon β-chlorethyl or β-bromoethyl diphenylacetate either of which may be prepared by the action of diphenylacetyl chloride upon ethylene chloro- or bromohydrin and from ethylene chloride or bromide and alkali salts of diphenylacetic acid.

*Example 2. — γ-4-morpholinopropyl diphenylacetate and its hydrochloride*

The required γ-4-morpholinopropanol is synthesized by heating 94.6 g. (1 mole) of trimethylene chlorohydrin with 174.3 g. (2 moles) of morpholine first to 100–105° for 1.5 hours, then to 125–130° for one-half hour in an oil bath. It is isolated from the reaction product by saturating the aqueous phase with solid sodium hydroxide. The resulting oil is dried with solid sodium hydroxide and distilled at reduced pressure. The yield of γ-4-morpholinopropanol by this procedure is 109.4 g. (75.2% of the theoretical), boiling at 147–149° under 21 mm. pressure and having $n_D^{20}=1.4762$; $n_D^{25}=1.4743$. This amino alcohol has been described by Gardner and Haenni (J. Am. Chem. Soc., 53, 2763 (1931)) who prepared it from 3-aminopropanol and β,β'-dichlorodiethyl ether.

Diphenylacetyl chloride is prepared according to the method given in Example 1 from 42.5 g. (0.2 mole) of diphenylacetic acid, dissolved in 200 ml. of sodium-dried benzene and treated in four portions with a solution of 29.3 g. (0.2 mole) of γ-4-morpholinopropanol in 50 ml. of dry benzene. The mixture is allowed to stand overnight, and is then refluxed in a water bath for 2 hours. Upon cooling the dark-brown two-phase system, the hydrochloride of γ-4-morpholinopropyl diphenylacetate separates which after recrystallization from ethyl acetate weighs 17 g. and melts at 119.5–120° C. (corr.). Anal.—Calc. for C21H27O3NCl: N, 3.72%. Found: 3.77 and 3.71%.

This ester hydrochloride is readily soluble in water and has the following formula:

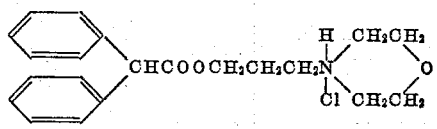

The free base is obtained by reaction of the aqueous solutions of the salt with an excess of saturated sodium carbonate solution, extracting with ether and distilling in vacuo after removal of ether from the dried solution. It is secured as a slightly yellow, viscous oil which boils at 223–227° at 1.25 mm. pressure.

*Example 3.—γ-4-morpholinobutyl diphenylacetate hydrochloride*

γ-4-morpholino-n-butanol is secured by heating tetramethylene chlorohydrine with morpholine and isolating the product as described for 3-4-morpholinopropanol in Example 2, the yield from crude tetramethylene chlorohydrine being 37.5% of theoretical of a colorless liquid boiling at 127–130° under 2 mm. pressure; $n_D^{20}=1.4769$.

Condensation of diphenylacetyl chloride from 15.1 g. (0.071 mole) of diphenylacetic acid, and the morpholinobutanol according to the conditions outlined in Example 2, gives an 86.5% yield of crude γ-4-morpholinobutyl diphenylacetate hydrochloride having the following formula,

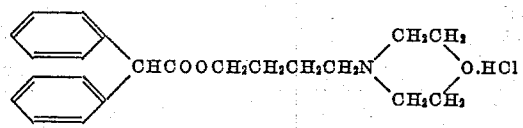

It melts at 118–119° (corr.) after twice recrystallizing from absolute alcohol-ether and then from ethyl acetate, separating from ethyl acetate in small white crystals. Anal.—Calc. for C22H28O3NCl: N, 3.59. Found: N, 3.55 and 3.53.

*Example 4.—α-methyl-β-4-morpholinoethyl diphenylacetate hydrochloride*

To diphenylacetyl chloride from 42.5 g. (0.2 mole) of diphenyl acetic acid, dissolved in 200 ml. of dry acetone, cooled in an ice bath, is added dropwise 30.4 g. (0.21 mole) of α-methyl-β-4-morpholinoethanol. When all the alcohol is added, the suspension is stirred at room temperature for 6 hours. The pale pink crystals, removed from the solution by filtration, are twice recrystallized from absolute alcohol to secure a 49.6% yield of α-methyl-β-4-morpholinoethyl diphenylacetate hydrochloride,

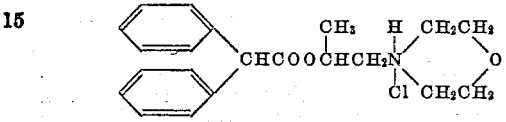

which melts at 214.5–215° C. (corr.). Anal.—Calc. for C21H26O3NCl: N, 3.72%. Found: N, 3.72 and 3.78%.

*Example 5.—β-methyl-β-4-morpholinopropyl diphenylacetate hydrochloride*

A mixture of 75.1 g. (1 mole) of isopropanol amine, 150 g. (1.05 mole) of β,β'-dichlorodiethyl ether and 208 g. (1.5 moles) of powdered anhydrous potassium carbonate, contained in a 1-liter flask provided with a reflux condenser and stirrer, is heated in an oil bath. The temperature must be raised to 170° before a vigorous reaction ensues. Removal of the bath for 25 minutes permits the evolution of carbon dioxide to moderate, then the mixture is heated at 170° for 5.3 hours and allowed to stand overnight. The semi-solid mass is warmed and broken up, then extracted with 670 ml. of benzene in four portions. The salt is dissolved in a minimum volume of water and twice extracted with benzene. The combined extracts are dried with calcium sulfate and distilled. β-methyl-β-4-morpholino-n-propanol distills at 110–116° at 2 mm. pressure and melts at 59–60° (corr.). Anal.—Calc. for C8H17O2N: N, 8.80. Found: N, 8.95 and 9.02.

Condensation of the β-methyl-β-4-morpholino-n-propanol with diphenylacetyl chloride according to the method described in Example 2, produces β-methyl-β-4-morpholino-n-propyl diphenylacetate hydrochloride having the following formula:

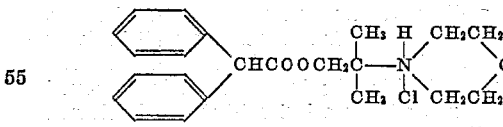

The yield is 72.2% of crystals melting at 123.5–124.5° (corr.), which melt one degree higher after one crystallization from ethyl acetate. Anal.—Calc. for C22H28O3NCl: N, 3.59%. Found: N, 3.64 and 3.55%.

*Example 6.—β,β-dimethyl-γ-4-morpholinopropyl diphenylacetate*

The diphenylacetyl chloride obtained from 21.2 g. (0.1 mole) of diphenylacetic acid, is dissolved in 40 ml. of sodium-dried dioxane, cooled in an ice bath and treated with a solution of 17.3 g. (0.1 mole) of β,β-dimethyl-γ-4-morpholino-n-propanol (B. P. 101–103° at 4 mm.; $n_D^{20}=1.4615$) in 25 ml. of dioxane. The reaction mixture is thoroughly stirred and allowed to stand overnight at room temperature. It is heated in an oil bath at 130–140° for 3.5 hours, the solvent distilled in vacuo, and the viscous residue dissolved in hot water. The cooled solution is extracted twice with ether, made alkaline with sodium carbonate and the resulting free base extracted with ether. The ether extract is washed thrice with 150 ml. portions of water and dried over anhydrous potassium carbonate. Evaporation of the ether yields the desired amino ester as a solid having the formula

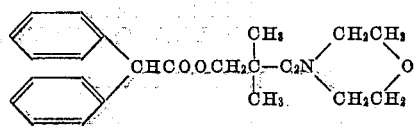

which when crystallized from petroleum ether, melts at 54.5–55.5° (corr.). Anal.—Calc. for $C_{23}H_{29}O_3N$: N, 3.82%. Found: N, 3.86%.

It is not essential to isolate the base since therapeutically useful salts of it may be made directly from the ether solution as described in Example 1, part B, or the desired acid may be added directly to the solution and the resulting salt isolated by complete removal or by concentration of the ether solution. The hydrochloride salt of the morpholino-alkyl ester described in this example melts at 149.5–150° (corr.).

*Example 7.—Preparation of ζ-(4-morpholino)-n-hexyl diphenylacetate hydrochloride*

A mixture of 26.5 grams (0.109 mole) of hexamethylene bromide, 27.5 grams (0.11 mole) of pulverized potassium diphenylacetate and 100 ml. of sodium-dried xylene is efficiently stirred and refluxed in a wax bath maintained at 170–180° for 5 or 6 hours.

The mixture is cooled and 19.2 grams (0.22 mole) of morpholine are introduced. The stirred mixture is refluxed at 155–165° for about 2¼ hours, cooled and decanted. The residue is extracted with 100 ml. of boiling xylene. The combined xylene solutions are filtered and the cold xylene solution extracted with dilute hydrochloric acid. The acid extract is cooled in ice, extracted twice with ether and then rendered basic with saturated sodium carbonate solution. The liberated base is taken up in ether and the ether solution is washed 3 times with cold water to remove all morpholine. The solution can be rapidly dried by mechanically shaking it over anhydrous potassium carbonate for 1½ hours. The hydrochloride is precipitated as an oil by the addition of an excess of 4.88 molar absolute alcoholic hydrochloric acid. Crystallization can be induced by cooling the oil in an ice-salt bath and rubbing the oil against the container with a glass rod. The crystals are filtered off and dried to yield about 15 grams of crude hydrochloride of melting point 104–107° C. Two crystallizations from anhydrous isopropanol and then two from ethyl acetate give white micro crystals of melting point 113–114° C. (corr.) of pure ζ-(4-morpholino)-n-hexyl diphenylacetate hydrochloride. The reactions involved in this example may be indicated by the following diagram:

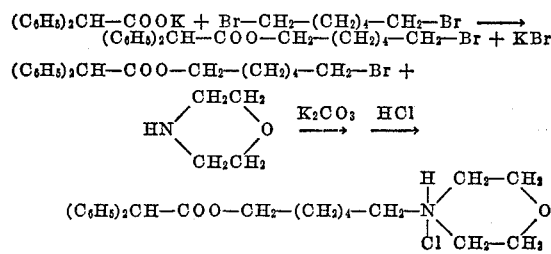

The scope of this invention also includes the following additional compounds which are made by the methods outlined in Examples 1 to 7:

γ-4-morpholino-α-methylpropyl diphenylacetate hydrochloride, a white crystalline solid having the formula

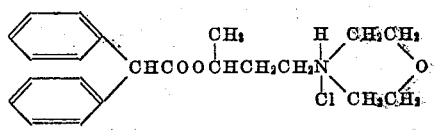

α-isobutyl-γ-4-morpholinopropyl diphenylacetate having the formula

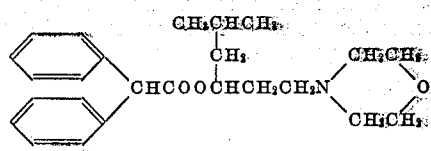

Some of the subject matter disclosed herein is also disclosed and claimed in our copending applications, Serial No. 514,162, filed December 13, 1943, now Patent No. 2,374,525, issued April 24, 1945, and Serial No. 542,262, filed June 26, 1944, now Patent No. 2,398,410, issued April 16, 1946.

What we claim as our invention is:

1. A morpholine substituted water-soluble ester salt of the formula

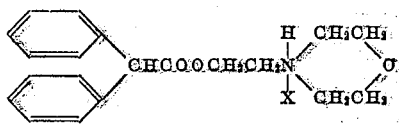

wherein X represents an anion of a non-oxidizing, non-toxic acid.

2. The compound having the formula

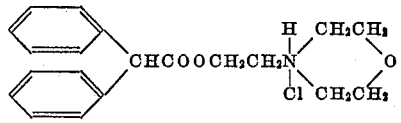

which is soluble in water and has powerful antispasmodic action.

3. The compound having the formula

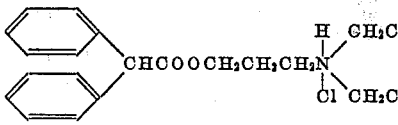

which is soluble in water and has powerful antispasmodic action.

4. Compounds selected from the group consisting of esters of the formula,

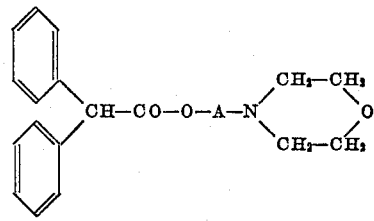

where A represents a member of the group consisting of straight chain and branched chain alkylene residues, and the acid addition salts of said esters.

5. Compounds selected from the group consisting of water-soluble acid addition salts of aliphatic esters having the formula,

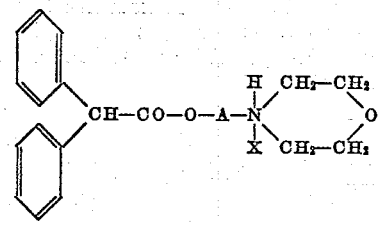

where A represents a member of the group consisting of straight chain and branched chain alkylene residues and X represents an anion of a non-oxidizing non-toxic water-solubilizing acid.

6. A morpholine substituted water-soluble ester salt of the formula,

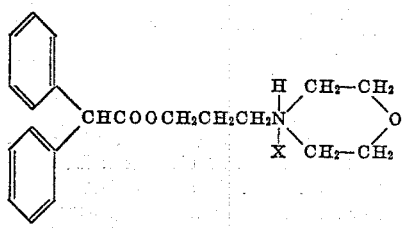

where X represents an anion of a non-oxidizing non-toxic acid.

7. Compounds selected from the group consisting of the esters of the formula

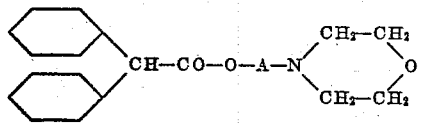

where A represents alkylene residue and acid addition salts of said esters.

8. A compound of the formula

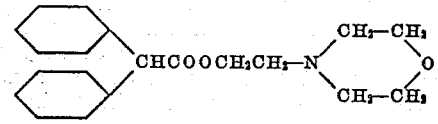

LEE C. CHENEY.
WILLIAM G. BYWATER.

REFERENCES CITED

The following references are of record in the file of this patent:

UNITED STATES PATENTS

| Number | Name | Date |
|---|---|---|
| 615,488 | Knorr | Dec. 6, 1898 |
| 2,079,962 | Miescher | May 11, 1937 |
| 2,138,763 | Graves | Nov. 29, 1938 |

FOREIGN PATENTS

| Number | Country | Date |
|---|---|---|
| 483,704 | Great Britain | 1938 |
| 655,404 | Germany | 1938 |
| 656,784 | Germany | 1938 |
| 657,526 | Germany | Mar. 7, 1938 |

OTHER REFERENCES

Jour. Amer. Chem. Soc., vol. 53, pp. 2763-9; ibid., vol. 55, pp. 365-70.

Richter, Chemie der Kohlenstoff Verbindungen. vol. III, p. 274 (1931).